United States Patent
Víg

(10) Patent No.: US 7,024,080 B2
(45) Date of Patent: Apr. 4, 2006

(54) SECURITY SEAL UNIT WITH OPTICAL FIBRE

(75) Inventor: Zoltán Víg, Budapest (HU)

(73) Assignee: Adeptum KFT, Budapest (HU)

( * ) Notice: Subject to any disclaimer, the term of this patent is extended or adjusted under 35 U.S.C. 154(b) by 53 days.

(21) Appl. No.: 10/496,402

(22) PCT Filed: Nov. 11, 2002

(86) PCT No.: PCT/HU02/00116

§ 371 (c)(1),
(2), (4) Date: May 11, 2004

(87) PCT Pub. No.: WO03/042945

PCT Pub. Date: May 22, 2003

(65) Prior Publication Data

US 2005/0002625 A1 Jan. 6, 2005

(30) Foreign Application Priority Data

Nov. 13, 2001 (HU) .................................... 0104870

(51) Int. Cl.
*G02B 6/04* (2006.01)
*G02B 6/44* (2006.01)
(52) U.S. Cl. ....................... 385/100; 385/94
(58) Field of Classification Search ............ 385/88–94, 385/115, 100, 47
See application file for complete search history.

(56) References Cited

U.S. PATENT DOCUMENTS

| | | | |
|---|---|---|---|
| 3,854,792 A | 12/1974 | Koelle | 350/96 B |
| 4,161,348 A | 7/1979 | Ulrich | 350/96.2 |
| 4,688,891 A | 8/1987 | Carratt et al. | 350/96.24 |
| 4,755,020 A * | 7/1988 | Willis et al. | 385/109 |
| 6,637,950 B1 * | 10/2003 | LeFlohic | 385/94 |

* cited by examiner

*Primary Examiner*—Akm Enayet Ullah
(74) *Attorney, Agent, or Firm*—Joseph G. Seeber

(57) ABSTRACT

The invention relates to an optical fiber sealing unit that contains a basic bundle consisting of light-transmitting fibers, a signalling bundle also consisting of light-transmitting fibers, a cable sheath, and receiving bodies positioned at both ends of the cable sheath. The receiving bodies have an accepting space suitable for the fixing of at least some of the light-transmitting fibers, and a transmitting body that allows light to pass through it. The basic bundle and the signalling bundle are arranged in the cable sheath, and the one end and the other end of the basic bundle are each fixed in the accepting space of a receiving body in such a way that they cannot move, one end of the basic bundle being fitted to the transmitting body of one of the receiving bodies, and the other end of the basic bundle being fitted to the transmitting body of the other receiving body. One end of the signalling bundle is fixed in the vicinity of the one end of the basic bundle so as to prevent light input, while the other end of the signalling bundle is clamped into the light-transmitting output member in the vicinity of the other end of the basic bundle.

9 Claims, 1 Drawing Sheet

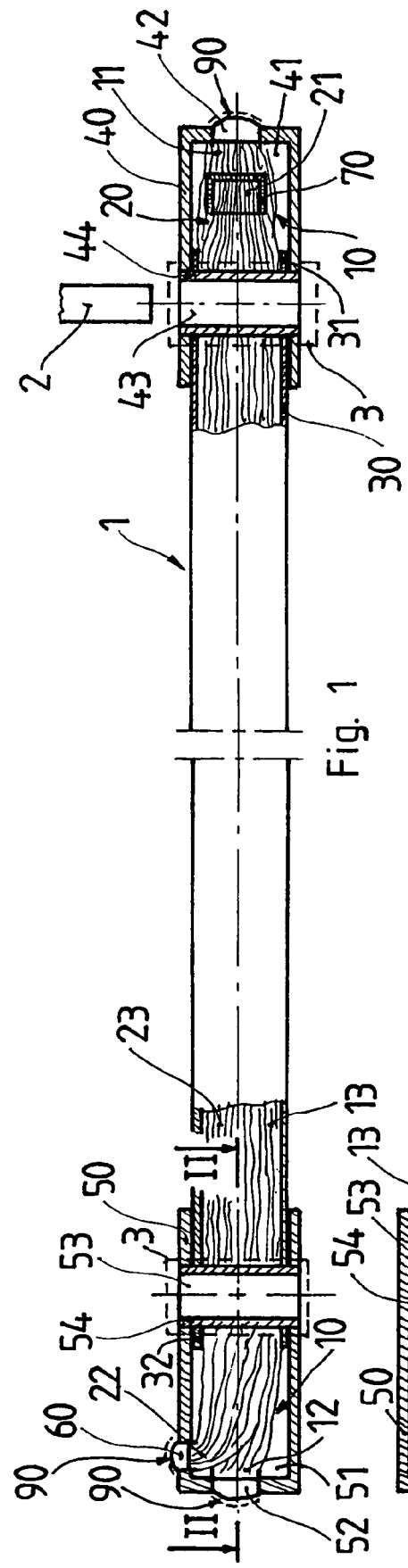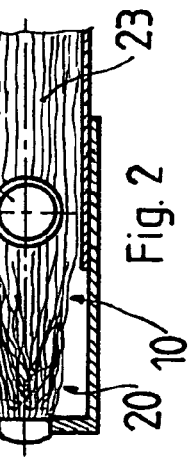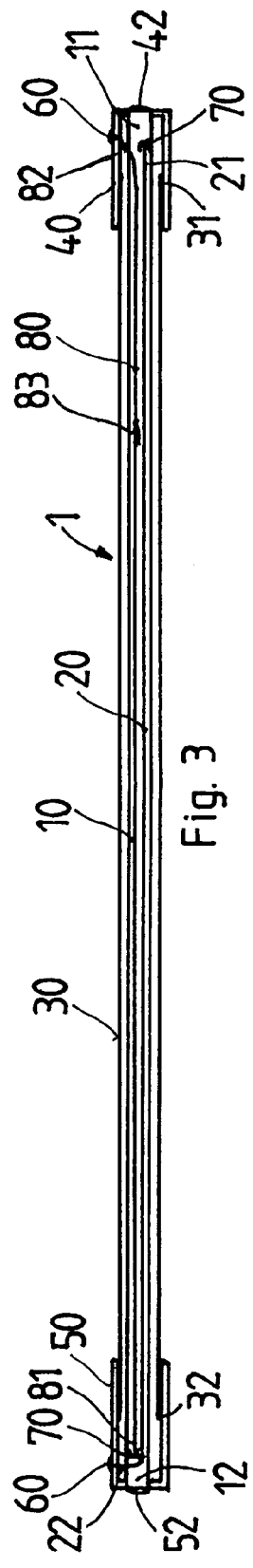

SECURITY SEAL UNIT WITH OPTICAL FIBRE

TECHNICAL FIELD

The invention relates to an optical fibre sealing unit that contains a basic bundle consisting of light-transmitting fibres, a signalling bundle also consisting of light-transmitting fibres, a cable sheath, and receiving bodies positioned at both ends of the cable sheath. The receiving bodies have an accepting space suitable for the fixing of at least some of the light-transmitting fibres and a transmitting body that allows light to pass through it. The basic bundle and the signalling bundle are arranged in the cable sheath, and one end and another end of the basic bundle are each fixed in the accepting space of a receiving body in such a way that they cannot move, one end of the basic bundle being fitted to the transmitting body of one of the receiving bodies and the other end of the basic bundle being fitted to the transmitting body of the other receiving body.

RELATED ART

Different security sealing devices are widely used for the secure and monitored locking of the load area of transportation devices when goods are transported and for simply detecting unauthorised access to the transported products. Sealing devices contain a lengthy sealing element threaded through loops on the wing doors or door of the loading area to be protected of transporting vehicles, e.g. trucks, or on the tarpaulin and on the frame delimiting this, which device is then clamped in a sealing structure. Numerous versions of these so-called "lead seals" have been used to this day.

There is a type of lead seal that consists of a lengthy sealing element, and a flexible signalling unit suitable for transmitting light made from optical fibres, in general, glass fibres. The essence is that the regularly positioned fibres at the two ends of the signalling unit are mixed up in the intermediate part of the signalling unit. By selecting a suitable light source and positioning it at one end of the undamaged signalling unit, the light travels unobstructed and with nearly the same intensity through the fibres, and appears at the other end of the signalling unit. However, if the signalling unit is cut, the unordered fibres are mixed up and the illuminating light travels through the subsequently fitted fibres with an energy loss. Devices which operate using this principle can be seen, among others, in the following patent documents: U.S. Pat. Nos. 4,161,348 and 3,854,792.

The disadvantage of the known solutions is that, although complex, the relatively precise fitting of the optical fibres after they have been cut can be solved, as a consequence of which the security sealing device is not able to perform what is expected of it. Due to the partially restored optical light transmission, the reduction of the intensity of the travelling light can only be shown with difficulty, for example, with costly instruments which, however, are not available in every case.

Monitoring direct light-transmission optical seals is made more difficult by the fact that, during the use of a cable bundle put together from several optical fibres, over time some of the constituent fibres get damaged or cracked, as a consequence of which the intensity of the light from the illuminating light source is reduced. As a result, when the transmitted light intensity of optical fibre security sealing units is reduced, it is difficult to decide whether the seal has lost some of its light-transmitting ability due to natural wear or as a consequence of intentional damage or breakage.

Another disadvantage is that, in cases where long signalling units need to be used, e.g., fitting truck tarpaulins with security sealing devices, then the significant distance can cause problems during the inspection of the integrity of the sealing unit.

SUMMARY OF THE INVENTION

The object of the invention is to overcome the deficiencies of the known optical fibre seals and to create a version that, on the one hand, makes it clearly determinable whether the sealing unit has been damaged during a simple inspection and, on the other hand, excludes the possibility of the sealing unit being restored to its original or similar condition after it has been damaged.

The basic concept of the invention was formed by the recognition that, if the optical fibres suitable for transmitting light are divided into several groups, and the groups are fixed at the ends of the closing unit in a way that is not usual, and if the optical fibres are arranged inside the cable sheath in a new way, then the task can be solved.

In accordance with the above object, the optical fibre sealing unit according to the invention comprises a basic bundle consisting of light-transmitting fibres, a signalling bundle also consisting of light-transmitting fibres, a cable sheath, and receiving bodies positioned at both ends of the cable sheath, the receiving bodies having an accepting space suitable for the fixing of at least some of the light-transmitting fibres and a transmitting body that allows light to pass through it. The basic bundle and the signalling bundle are arranged in the cable sheath, and the one end and the other end of the basic bundle are each fixed in the accepting space of a receiving body in such a way that they cannot move. One end of the basic bundle is fitted to the transmitting body of one of the receiving bodies and the other end of the basic bundle is fitted to the transmitting body of the other receiving body. The invention is set up in such a way that one end of the signalling bundle is fixed in the vicinity of the one end of the basic bundle so as to prevent tight input, while the other end of the signalling bundle is clamped into the light-transmitting output member in the vicinity of the other end of the basic bundle.

A further feature of the sealing unit according to the invention is that the output member is built into the receiving body that fixes the other end of the basic bundle, and the other end of the signalling bundle is connected to the output member via the accepting space of the receiving body fixing the other end of the basic bundle.

In one embodiment of the sealing unit, one end of the signalling bundle is contained in a light-proof cap.

In another embodiment of the invention, the one end of the signalling bundle is positioned in the accepting space of the receiving body that fixes one end of the basic bundle.

From the point of view of the sealing unit, it may be desirable to couple it with a supplementary signalling bundle made up of light-transmitting fibres, one end of the supplementary signalling bundle being clamped into a light-transmitting output member fixed in the vicinity of one end of the basic bundle, the other end of the supplementary signalling bundle being positioned in the vicinity of the other end of the basic bundle in such a way as to prevent light input.

In a further embodiment of the invention, the one receiving body and the other receiving body have a closing member for fixing the locking body.

In a further embodiment of the sealing unit, the closing members are formed by closing apertures in the one receiving body and the other receiving body, and guide sheaths surrounding the closing apertures. The guide sheaths are surrounded by the disordered light-transmitting fibres of the basic bundle and the signalling bundle and/or the supplementary signalling bundle.

In a still further embodiment of the invention, the transmitting body of the one receiving body and the transmitting member of the other receiving body, as well as the output member, have optical lenses.

The sealing unit according to the invention has numerous advantageous characteristics. The most important of these is that due to the new light-transmitting fibre arrangement, grouping and fixing, when the sealing unit is cut at any position, the fibres of the basic bundle and the signalling bundle become absolutely and irrecoverably mixed up. Thus, during the cutting of the sealing unit, without using separate auxiliary devices or measurement instruments, an attempt at unauthorised penetration can be simply, immediately and clearly observed and determined.

Another advantage is that, due to the use of the signalling bundle positioned in a new way, the original condition cannot be restored, and in this respect, there is no way of covering up the traces after a "break in" by repairing the damaged elements of the sealing unit.

Another advantage is that, in the case of a suitably set up basic bundle and signalling bundle, the sealing device according to the invention contains several essentially independent security and check paths, that is, its protection and signalling ability exceed that of the traditional lead seal type security sealing devices.

BRIEF DESCRIPTION OF DRAWINGS

In the following, the invention is presented in detail in connection with examples on the basis of the drawings. In the drawings:

FIG. 1 shows a side view in partial section of the sealing unit according to the invention in side view;

FIG. 2 shows a detailed cross section of the sealing unit taken along the plane II—II of FIG. 1; and FIG. 3 shows the outline of another possible embodiment of the sealing unit.

DETAILED DESCRIPTION

FIGS. 1 and 2 contain a possible embodiment of the sealing unit according to the invention. It can be seen that the sealing unit 1 contains the basic bundle 10 and signalling bundle 20 placed in a cable sheath 30 sealed with the receiving body 40 at the one end 31 and with the receiving body 50 at the other end 32 The basic bundle 10 is an optical cable made up of light-transmitting fibres 13, while the signalling bundle 20 is an optical cable made up of light-transmitting fibres 23. The receiving body 40 has an accepting space 41 for receiving the light-transmitting fibres 13 forming the one end 11 of the basic bundle 10 as well as a transmitting body 42. In the present case, the transmitting body 42 has an opening in the receiving body 40 that allows the passage of light into an area in which there is an optical lens 90 fixed. The optical lens 90 of the transmitting body 42 is connected to the one end 11 of the light-transmitting fibres 13 that form the basic bundle 10, so that light gets into the one end 11 of the basic bundle 10 through the transmitting body 42.

Also, in the accepting space 41 of the receiving body 40, it is practical for the one end 21 of the signalling bundle 20 to be positioned and embedded among the light-transmitting fibres 13 that form the basic bundle 10, which, however, is sealed in the light-proof cap 70. Due to the effect of the light-proof cap 70, light arriving from the external environment cannot penetrate into the light-transmitting fibres 23 of the signalling bundle 20 via the one end 21 of the signalling bundle 20.

It can also be observed in FIG. 1 that the other end 12 of the basic bundle 10 and the other end 22 of the signalling bundle 20 are positioned in the accepting space 51 of the receiving body 50 positioned at the other end 32 of the cable sheath 30 of the sealing unit 1. The other end 12 of the light-transmitting fibres 13 forming the basic bundle 10 is connected to the optical lens 90 fitted into the transmitting body 52, which makes it possible for the light rays running along the light-transmitting fibres 13 of the basic bundle 10 to escape from the sealing unit 1. Beside the transmitting body 52, the receiving body 50 also includes the output member 60, which also has an optical lens 90. The output member 60 is fixed to the other end 22 of the light-transmitting fibres 23 of the signalling bundle 20 in such a way that the light-transmitting fibres 23 connect to the optical lens 90.

It should be mentioned here that the optical lenses 90 do not necessarily have to be independent components, and a solution can be imagined where the one end 11 and the other end 12 of the light-transmitting fibres 13 of the basic bundle 10 and the other end 22 of the light-transmitting fibres 23 of the signalling bundle 20 are suitably clamped and grounded to suit the optical objective.

It can also be observed in FIG. 1 that, in the present embodiment of the sealing unit 1, the receiving body 40 and the receiving body 50 have closing members 3 for connecting the locking body 2. In the receiving body 40, the closing member 3 consists of a closing aperture 43 and a guide sheath 44 surrounding the closing aperture 43, while in the receiving body 50, it consists of a closing aperture 53 having a shape and form the same as the closing aperture 43, and a guide sheath 54 surrounding the closing aperture 53.

FIG. 2 shows that the light-transmitting fibres 13 and the light-transmitting fibres 23 of the basic bundle 10 and the signalling bundle 20 of the sealing unit 1 in the accepting space 51 of the receiving body 50 completely surround the guide sheath 54 that completely delimits the closing aperture 53. The situation is the same with the guide sheath 44 of the closing member 3 belonging to the receiving body 40 of the sealing unit 1. It should be mentioned here, however, that the closing member 3 does not have to be in the form, and operate in the same manner, as presented in FIGS. 1 and 2. Completely different solutions can also be imagined. In that regard, an arrangement is possible in which the base of the external form of the receiving body 40 and receiving body 50, e.g., cone, pyramid or hammer, serves as the closing member 3, and provides for suitable closing in this way.

During the use of the sealing unit according to FIG. 1, the cable sheath 30 and the receiving body 40 at the one end 31 of the cable sheath 30 have to be threaded through the fixing loops of the closing body of the area to be protected, e.g., a tarpaulin or door. Then, the closing member 3 of the receiving body 40 and the closing member 3 of the receiving body 50 are placed next to each other, and are locked with the locking body 2. After the sealing unit 1 has been fixed, in the case of a goods vehicle, the consignment can be started.

At the destination, the integrity of the sealing unit 1 can be determined by directing a light ray into the light-transmitting fibres 13 of the basic bundle 10 via the optical lens 90 belonging to the transmitting body 42 of one of the receiving bodies 40 of the sealing unit 1. If the basic bundle 10 is undamaged, then the light rays will travel from one end 11 of the basic bundle 10 directly through the light-transmitting fibres 13 to the other end 12 of the basic bundle 10, and the optical lens 90 of the transmitting body 52 of the receiving body 50 holding the other end 12 of the basic bundle 10 will light up, while the optical lens 90 of the output member 60 of the receiving body 50 will remain dark, as light cannot get into the light-transmitting fibres 23 of the signalling bundle 20 in the cable sheath 30.

If, however, during transportation, persons have tried to gain access to the protected area by cutting the sealing unit, when the sealing unit 1 is cut, the disordered and mixed up light-transmitting fibres 13 and light-transmitting fibres 23 of the basic bundle 10 and the signalling bundle 20 will touch each other when refitted so that some of the light-transmitting fibres 13 of the basic bundle 10 in the cross section of the cut meet the light-transmitting fibres 23 of the signalling bundle 20. In such a case, during the inspection at the destination, the light getting into the transmitting body 42 of the receiving body 40 of the sealing unit 1 will be split up within the cable sheath 30 at the place of damage, and will continue so that a part of it will get to the transmitting body 52 of the other end 12 of the basic bundle 10, while the other part will go from the light-transmitting fibre 13 to the light-transmitting fibre 23 and, continuing its path in the signalling bundle 20, it will arrive at the output member 60 of the receiving body 50 and illuminate it. At this point, the brightness of the transmitting body 52 will go down, and at the same time, some of the light put in will appear at the output member 60, which will simply and reliably signal the fact of unauthorised penetration.

In FIG. 3, a sealing unit 1 can be seen in which there is, beside the basic bundle 10 and the signalling bundle 20, a supplementary signalling bundle 80 which has the same task as the signalling bundle 20 in the space delimited by the cable sheath 30 having one end 31 fixed to the receiving body 40 and the other end 32 fixed to the receiving body 50. The supplementary signalling bundle 80 is also an optical cable put together from light-transmitting fibres, which is practically the same as the signalling bundle 20. One end 81 of the supplementary signalling bundle 80 is also closed with a light-proof cap 70, and its other end 82 also has an output member 60. In this form—similar to that presented in FIG. 1—the one end 11 of the basic bundle 10 is connected to the transmitting body 42 of the receiving body 40, and the other end 12 of the basic bundle 10 is connected to the transmitting body 52 of the receiving body 50, while the one end 21 of the signalling bundle 20 closed with a light-proof cap 70 is fitted to the receiving body 40, and the other end 22 of the signalling bundle 20 connected to the output member 60 is fitted to the receiving body 50. The one end 81, closed with a light-proof cap 70 of the supplementary signalling bundle 80, is fitted into the receiving body 40, and the output member 60 at the other end 82 of the supplementary signalling bundle 80 is fitted into the receiving unit 40 of the sealing unit 1.

In this embodiment, at the destination, the inspection can be carried out from both the receiving body 40 and the receiving body 50 of the sealing unit 1. In the case of sabotage, on illuminating the basic bundle 10 from the transmitting body 42 of the receiving body 40, the process presented in connection with FIG. 1 is carried out. However, when light rays are directed into the light-transmitting fibres 13 of the basic bundle 10 from the transmitting body 52 of the receiving body 50, then at the breakage point, the light travelling in the light-transmitting fibres 13 of the basic bundle 10 from the receiving body 50 toward the receiving body 40 goes from the light-transmitting fibres 13 to the light-transmitting fibres 83 of the supplementary signalling bundle 80. The light going into the light-transmitting fibres 83, on reaching the other end 82 fitted into the output member fixed in the receiving body 40, lights up the optical lens 90 at the other end 82 of the supplementary signalling bundle 80, and so inspection is possible in a direction opposite to that presented in connection with FIG. 1.

The invention can be used well in all areas where the movement of objects needs to be prevented, in determined closed areas, e.g. the load areas of goods vehicles and valuables, and in closed areas where the goods and products placed in the closed areas need to be protected from theft and penetration.

The invention claimed is:

1. An optical fibre sealing unit, comprising:
    a basic bundle including light-transmitting fibres;
    a signalling bundle also including light-transmitting fibres;
    a cable sheath;
    receiving bodies positioned at both ends of the cable sheath, each of the receiving bodies having an accepting space suitable for fixing at least some of the light-transmitting fibres; and
    a transmitting body that allows light to pass through it;
    wherein the basic bundle and the signalling bundle are arranged in the cable sheath, and one end and another end of the basic bundle are fixed in the accepting space of a respective one of the receiving bodies in such a way that they cannot move;
    wherein said one end of the basic bundle is fitted to a transmitting body of one of the receiving bodies, and said another end of the basic bundle is fitted to a transmitting body of another of the receiving bodies; and
    wherein one end of the signalling bundle is fixed in a vicinity of said one end of the basic bundle so as to prevent light input, and another end of the signalling bundle is clamped into a light-transmitting output member in a vicinity of said another end of the basic bundle.

2. The optical fibre sealing unit of claim 1, further comprising an output member built into said respective one of said receiving bodies that fixes said another end of the basic bundle, and said another end of the signalling bundle is connected to the output member via said accepting space of said respective one of said receiving bodies that fixes said another end of the basic bundle.

3. The optical fibre sealing unit of claim 2, wherein said one end of the signalling bundle is contained in a light-proof cap.

4. The optical fibre sealing unit of claim 3, wherein said one end of the signalling bundle is positioned in said accepting space of said respective one of said receiving bodies that fixes said one end of said basic bundle.

5. The optical fibre sealing unit of claim 4, further comprising a light-transmitting output member fixed in a vicinity of said one end of the basic bundle, and a supplementary signalling bundle to which said optical fibre sealing unit is coupled, said supplementary signalling bundle including light-transmitting fibres, one end of the supplementary signalling bundle being clamped into the light-transmitting output member, and another end of the supplementary signalling bundle being positioned in a vicinity of said another end of the basic bundle in such a way as to prevent light input.

6. The optical fibre sealing unit of claim 5, wherein each of said one receiving body and said another receiving body has a closing member for fixing a locking body.

7. The optical fibre sealing unit of claim 6, wherein each closing member is formed by a closing aperture in a respective one of said one receiving body and said another receiving body, and by a respective guide sheath surrounding said closing aperture.

8. The optical fibre sealing unit of claim 7, wherein each respective guide sheath is surrounded by at least one disordered light-transmitting fibre of at least one of the basic bundle, the signalling bundle and the supplementary signalling bundle.

9. The optical fibre sealing unit of claim 8, wherein each of a transmitting member of said one receiving body and a transmitting member of said another receiving body, and the output member, has an optical lens.

* * * * *